UNITED STATES PATENT OFFICE.

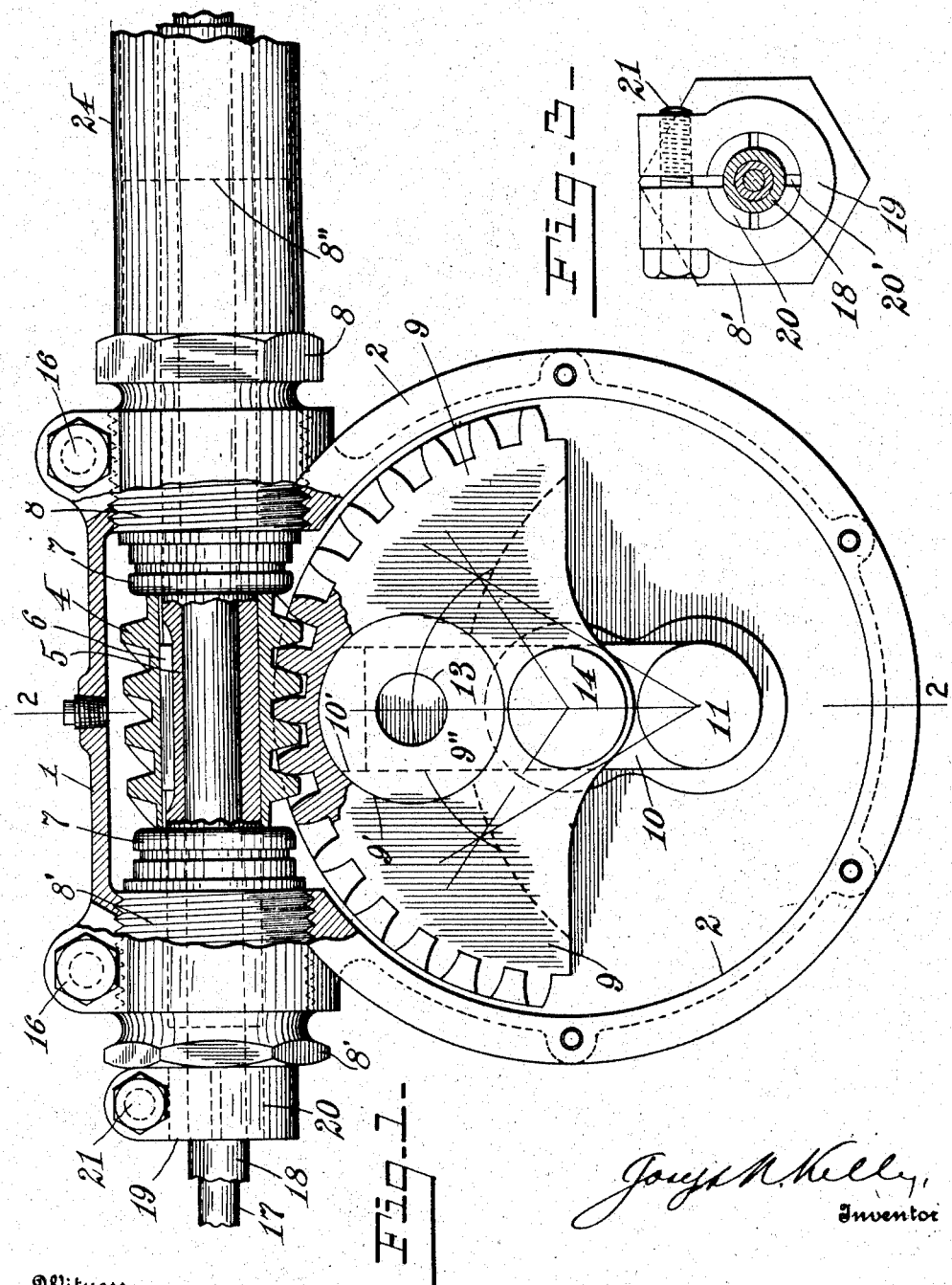

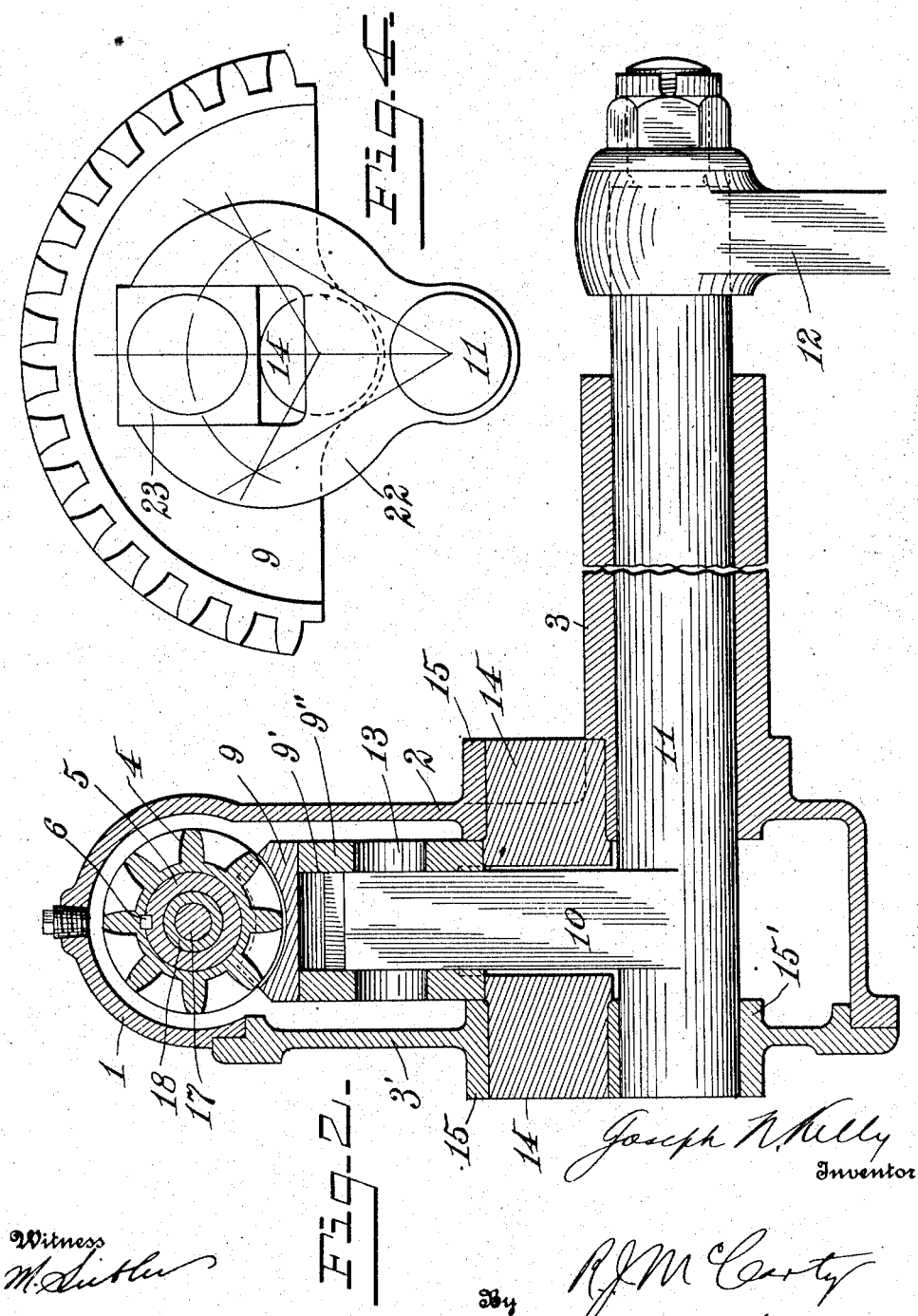

JOSEPH N. KELLY, OF DAYTON, OHIO.

STEERING-GEAR MECHANISM.

1,334,498.  Specification of Letters Patent.  Patented Mar. 23, 1920.

Application filed April 14, 1919. Serial No. 289,921.

*To all whom it may concern:*

Be it known that I, JOSEPH N. KELLY, a citizen of the United States, residing at Dayton, in the county of Montgomery and State of Ohio, have invented certain new and useful Improvements in Steering-Gear Mechanism, of which the following is a specification.

This invention relates to steering gear mechanism of a broad utility or application, but more especially designed for use in connection with motor-driven vehicles.

In the ordinary or general type of automobile steering gear mechanism comprising worms and worm gears, the rocker shaft is attached or made integral with the worm wheel or sector with the result that road shocks centering in the rocker shaft are transmitted directly to the teeth of the worm wheel or sector and thence to the threads of the worm. The natural result of this is, the said worm wheel or sector and the worm wear very rapidly and objectionable looseness or back-lash takes place in a comparatively short time, such looseness having a tendency to increase with apparent rapidity when it once manifests itself.

This well known detrimental feature of steering gear mechanism has resulted in many instances in manufacturers of steering gear mechanism producing a complete worm wheel instead of a sector, and when the wear becomes too great the wheel is taken out and moved upon its axis a sufficient extent to cause new or unworn teeth therein to engage the worm. This practice applies only to the worm wheel, the wear of the worm not being similarly taken care of. As a consequence all looseness between the worm wheel and the worm due to wear is not remedied by thus shifting the wheel.

It is therefore the prime object of the present invention to provide a steering gear mechanism in the usage of which the foregoing objections are avoided. This avoidance is accomplished by a steering gear construction in which the center of the rocker shaft occupies a plane below the worm wheel or sector and which involves other peculiarities to be hereinafter specified. By this arrangement the disastrous effects to the type of steering gear, due to road shocks referred to above, are avoided. In the present invention the shocks mentioned, while they center in the rocker shaft, are transmitted to the worm wheel or sector at a point between the teeth thereof and the bearings thereof, with the result that the wear on the teeth of the worm wheel or sector is greatly eliminated if not wholly avoided.

Fully realizing that wear on these parts of steering gear mechanism is a condition that has to be dealt with, I have provided a practical and efficient means which consists in making the threaded portion of the worm shaft on a suitable taper so that when wear becomes apparent the threaded portion of said worm shaft may be shifted longitudinally to present a larger diameter thereof to the teeth of the worm wheel or sector, which may be done repeatedly as wear takes place, without disassembling or removing the gear from its operative position. The result is that any looseness in the engagement between the teeth of the worm wheel or sector and the worm may be compensated with slight effort.

Having referred to the objects and aims of my improved steering gear mechanism, reference is now made to the accompanying drawings which illustrate the same. Of these drawings, Figure 1 is a partial sectional side elevation of a steering gear made in accordance with my invention.

Fig. 2 is a cross sectional view thereof on the line 2—2 of Fig. 1.

Fig. 3 is a detail elevation of the means for holding the control and ignition devices in position in relation to the steering gear, and Fig. 4 is a detail elevation of a modified construction of the worm wheel or sector and the rocker shaft.

In a more particular description of the invention similar reference characters will serve to indicate the same parts in the drawings.

The gear housing which incloses the several movable parts is preferably made in the form shown, but it may be changed more or less as conditions of manufacture may require. As shown it consists of an upper cylindrical portion —1—, a lower enlarged portion —2—, and a lower extension in the form of a bearing —3— which serves to attach the gear to a suitable bracket on the side frame of the car (not shown.)

The said housing is inclosed on one side by a cover plate —3— which furnishes bearings on that side for the worm wheel or sector and the rocker shaft. The worm —4— is suitably tapered to compensate for wear and occupies a position in the upper cylindrical part of the housing. It is mounted on the steering shaft —5— by means of a key —6— so that it may turn with said shaft but be prevented from having longitudinal movement thereon. The ends of said worm abut with end thrust antifriction bearings —7—7— on the steering shaft, said bearings being held by upper and lower nuts —8— —8'— which screw into the opposite ends of the worm housing —1—. The upper nut —8— has a boss —8''— shown in broken lines in Fig. 1 as extending into the steering shaft casing —24—. The worm holding nuts —8— —8'— are locked by binding screws —16— after the worm is in proper position. The steering shaft —5— projects into the lower nut —8'— as is shown in broken lines, Fig. 1, and has a bearing at that point. When undue wear on the teeth of the gear begins to manifest itself, the lower nut —8'— may be withdrawn a suitable amount and the upper nut —8— advanced in the worm housing in a like manner, and the binding screws —16— tightened thereby bringing in engagement a portion of the worm that is slightly larger in diameter with the teeth of the worm wheel or sector. The worm wheel —9— or sector is preferably made of drop forging and the desirable form is that shown in the drawings. It may, however, be modified in any manner to suit manufacturing conditions. As is shown in Fig. 1, the said worm wheel or sector has an opening —9'— through the body thereof, between the teeth and the bearing thereof. Within the said opening a swivel block —9''— is adapted to rotate. This swivel block has such movement owing to its being attached to a rocker arm —10—. The said swivel block —9''— has also a suitably shaped opening —10'— extending vertically into which the end of said rocker arm projects and in which it slides to a certain extent when movement is imparted to the worm wheel or sector from the worm. The rocker arm —10— is attached to the rocker shaft —11—. As the worm —4— is revolved in either direction from the steering shaft, the worm wheel or sector —9— will begin to start or change its position, the rocker arm will correspondingly move and also the rocker shaft —11—. The steering arm —12— which may be attached to the rocker shaft in any satisfactory manner also receives the same movement. The openings —13— in the sides of the swivel block —9''— serve for lubricating purposes and are otherwise a manufacturing expedient. The worm wheel or sector is mounted in the lower portion of the gear housing. The base thereof terminates in opposite trunnions —14— which enter bearings —15— which extend from the said housing, one of said bearings being in the cover plate —3'—. The short end of the rocker shaft —11— has a bearing in the lower bearing portion —15'— of said cover plate while the longer part of said rocker shaft extends through the gudgeon or bearing —3— projecting from the lower portion of the gear housing. While the worm wheel or sector —9— is shown in Fig. 1 as moving through an angle of about 120° the rocker shaft —11— will complete a movement through an angle of about 60°. This reduction in the motion of the gear obviously increases the leverage and produces a gear more powerful as compared to one in which the rocker shaft, worm and worm wheel are directly connected.

The distribution of these elements as described also renders the gear irreversible as to the initial transmission of motion; a feature that is not only of decided advantage but also of necessity in steering gear mechanism. The shaft —17— and tube —18— extend through the steering shaft —5— and control the fuel and ignition and are common to all steering gear mechanism.

In Fig. 3, is shown means for fastening or locking the control tube —18—. For this purpose a boss —20— is formed on the lower worm nut —8'—. This boss extends through a clamp collar —19— and the boss has suitable slots —20'— cut therein, preferably four in number. The said slotted boss is surrounded by the clamp collar —19— which is tightened or released thereon by means of a bolt —21— that passes the arms of said collar. In tightening said bolt the slotted boss —20— will compress against the control tube —18— and firmly hold the same in its proper position.

The radial lines in Fig. 1, indicate the angles of travel through which the worm wheel or sector and the rocker arm move from one extreme position to the other and the relative movements of the worm wheel and the swivel block carried thereby.

In Fig. 4, I have shown a modification in the manner of connecting the rocker shaft with the worm wheel or sector. As there shown the rocker arm is of a forked or bifurcated form —22— which engages the opposite sides of the swivel block, which in this case has a square or rectangular part —23— that is received by the said forked portion of said rocker arm.

The gear may be changed from a right to a left hand drive. As shown in Fig. 1, it is a right hand drive, but the housing being made symmetrical it is adapted to either a right or left drive by transposing the worm —4— and upper and lower nuts —8— and —8'— to the opposite ends of the housing. In other words by reversing these parts relative to the housing.

I have with some particularity described my invention but it will be understood that the instrumentalities so described may be modified or changed without departing from the underlying principles thereof. I therefore do not desire to be limited to the details of construction described wherever these may be changed to meet the expedients of manufacture or without departing from the scope of the invention.

Having described my invention, I claim:

1. In a steering gear, the combination with a worm shaft the threads of which increase in diameter from one end to the other, whereby said worm shaft is capable of being adjusted to take up wear, of a worm gear directly driven therefrom, and a rocker shaft directly connected with and driven from said worm gear.

2. In a steering gear, the combination with a tapered worm shaft, of a worm gear engaged thereby, a rock shaft, a rocker arm fixed to said rock shaft, and an oscillating member mounted in said worm gear and with which the rocker arm has a slidable connection.

3. In a steering gear, the combination with a tapered worm shaft, of a worm gear engaged by said worm shaft, and a rocker shaft connected to said worm gear by a rocker arm and an oscillating member, the rocker arm having a slidable connection with said oscillating member.

4. In a steering gear, the combination with a worm shaft, of a rocker shaft, and motion transmission devices interposed between said worm shaft and the rocker shaft, said motion transmission devices including a worm gear, a swivel member carried by said worm gear, and an arm extended from said rocker shaft and through said swivel member.

5. In a steering gear, the combination with a worm shaft the threads of which gradually increase in diameter, of a worm gear engaged thereby, a rocker shaft, and an arm extended from said rocker shaft and slidably connected with the worm gear.

6. In a steering gear, the combination with a worm shaft the threads of which gradually increase in diameter from one end to the other, of a rocker shaft, and motion transmission devices interposed between said worm shaft and said rocker shaft, said rocker shaft and said transmission devices being movable on three different axes of rotation, and one of said transmission devices having in addition thereto a slidable movement with reference to the other of said transmission devices.

7. In a steering gear, the combination with a steering shaft, and a worm adjustable thereon, said worm having its threads increased in diameter from one end to the other, a worm wheel or sector engaged by said worm, a rocker shaft, and a rocker arm connecting said rocker shaft with said worm wheel through a swivel connection with said wheel.

8. In a steering gear, the combination with a steering shaft, a worm mounted thereon the threads of which are increased in diameter gradually from one end to the other, means engaging the ends of said worm for adjusting it longitudinally and holding it in its adjusted positions, a worm wheel or sector engaged by said worm, a swivel piece mounted in said worm wheel, a rocker shaft, and a rocker arm connecting said rocker shaft with said swivel piece.

9. In a steering gear, the combination with a steering shaft, and a worm mounted thereon the threads of which gradually increase in diameter from one end to the other, a worm wheel or sector driven from said worm, an oscillating member carried by said worm wheel or sector, a rocker shaft, and a rocker arm extending from said rocker shaft and having a slidable connection with said oscillating member.

In testimony whereof I affix my signature.

JOSEPH N. KELLY.